US005364165A

United States Patent [19]

Okamoto

[11] Patent Number: 5,364,165

[45] Date of Patent: Nov. 15, 1994

[54] LATCH ASSEMBLY FOR A WHEELCHAIR

[75] Inventor: James Okamoto, Clovis, Calif.

[73] Assignee: Quickie Designs Inc., Fresno, Calif.

[21] Appl. No.: 966,456

[22] Filed: Oct. 26, 1992

[51] Int. Cl.[5] .......... A47C 4/00; B62M 1/00

[52] U.S. Cl. .......... 297/364; 297/378.1; 297/378.12; 280/304.1

[58] Field of Search .......... 297/364, 378.1, 378.12, 297/378.14, 378.13, 378.11, 353, 362.12, 363, 365, 369; 280/304.1, 250.1

[56] References Cited

U.S. PATENT DOCUMENTS

| | | | |
|---|---|---|---|
| 513,735 | 1/1894 | Russell | 297/364 |
| 865,541 | 9/1907 | Storm | 297/378.12 |
| 1,326,275 | 12/1919 | Koerner | 297/364 |
| 2,528,505 | 11/1950 | Fitzpatrick et al. | 297/378.12 |
| 2,713,891 | 7/1955 | Linquist | 297/378.12 |
| 2,792,876 | 5/1957 | Emary | 297/364 |
| 3,652,127 | 3/1972 | Freedman et al. | 297/378.12 |
| 4,564,404 | 1/1986 | Rauschenberger | 297/378.12 |
| 4,592,570 | 6/1986 | Nassiri | 297/378.12 |
| 5,069,503 | 12/1991 | Martinez | 297/378.12 |
| 5,152,543 | 10/1992 | Sims et al. | 297/378.12 |

*Primary Examiner*—Clifford D. Crowder
*Assistant Examiner*—Amy B. Vanatta
*Attorney, Agent, or Firm*—Flehr, Hohbach, Test, Albritton & Herbert

[57] ABSTRACT

A backrest latch assembly (20) is provided for a wheelchair (10) having a movable frame member (11) mounted to a stationary frame member (12) for articulation between a deployed position and a moved position. The latch assembly (20) includes a sliding bolt (22) having a first surface (30) and a base member (23) having a second surface (31). In a latched position, the first surface (30) is oriented in an angularly aligned orientation and cooperates with the second surface (31) to releasably latch the movable frame member (11) to the stationary frame member (12) in the deployed position. The bolt (22) can be axially displaced and rotated to a released position, at which the bolt (22) is retained in a stable condition with the first surface (30) out of engagement with the second surface (31) to allow manual release or disengagement of the bolt (22) without relatching of the bolt. Thereafter, the movable frame member (11) is free to articulate from the deployed position to the moved position. A biasing mechanism (24) and bolt guiding assembly (44, 45) biases the bolt (22) for automatic movement back to the aligned orientation upon articulation of the movable frame member (11) from the deployed position to the moved position.

20 Claims, 3 Drawing Sheets

LATCH ASSEMBLY FOR A WHEELCHAIR

TECHNICAL FIELD

The present invention relates, generally, to latch assemblies for wheelchair apparatus and, more particularly, to foldable backrest latch assemblies for wheelchair apparatus.

BACKGROUND ART

Wheelchairs have been designed to provide transportation for the physically impaired, often emphasizing user comfort, portability and flexibility. Because of the individual needs and requirements of the wheelchair occupants, a variety of styles and shapes have been developed which cater to their specific needs. Thus, both manual and power driven wheelchair apparatus have become significantly more sophisticated during the past decade.

One advantageous feature common to both manual and power driven wheelchair apparatus is to design the wheelchair frame as lightweight and as compact as physically possible. Manual wheelchair frames, in particular, are often completely or partially foldable or collapsible which reduces the overall size of the wheelchair. Manual wheelchairs are thus particularly portable, storable and transportable in vehicles. Moreover, because of this collapsibility, special vehicle modifications are often not necessary to carry collapsible wheelchairs.

Power driven wheelchair apparatus, on the other hand, generally require a more rigid frame than their manual counterparts since the frame is ordinarily subjected to increased loads due to higher operating speeds. Further, the powered wheelchair frame must be strong enough to carry the weight of the batteries and electric motor assembly. Power driven wheelchair apparatus, accordingly, are usually bulkier and not as portable nor as collapsible as manual wheelchair apparatus.

To a limited extent, however, powered wheelchairs may be folded and/or collapsed. Often, the backrest portion of the seat support pivotally folds down from a generally vertical position to a generally horizontal position parallel to and atop the seat. This maneuver provides partial collapsibility of the wheelchair frame which reduces the overall dimensions. Typically, the backrest is locked in an operating vertical position by a pair of spring loaded latch pins which are positioned on opposing lateral sides at the back portion of the backrest. These pins are generally biased in an extended position to continuously engage corresponding receiving apertures provided in the seat support frame. The backrest, therefore, may be latched in the generally vertical position with respect to the seat support, and released for folding or pivoting to a position just above the seat.

One problem encountered with these spring loaded latch pin devices is that both latches must be simultaneously gripped and the latch pins disengaged in order to release the backrest from the deployed and latched position. Because the opposing latch pins are biased to an extended position to engage the receiving apertures, two-handed continuous manual engagement of the latches is generally necessary to withdraw both pins from both apertures. Furthermore, the backrest must be articulated simultaneously while holding the latch pins by an amount sufficient to move the latch pins out of alignment with the apertures.

Failure to continuously withdraw the pair of latch pins from the corresponding receiving apertures while simultaneously commencing movement of the backrest from the vertical position will permit the latch pins to pop back into the corresponding apertures. Two-handed manual operation of the latch pins, in addition, is particularly difficult for many physically impaired users. Often, the wheelchair occupant may have limited use of one or both hands. The occupant's safety may also be jeopardized since they may need one hand free for stability and leverage. Moreover, moving the backrest toward the horizontal position while gripping the backrest proximate latch pins area (i.e., to operate the latch pins) is not an optimum position to commence pivotal movement thereof. Accordingly, conventional wheelchair backrest latch assemblies can be very awkward and inconvenient for the physically impaired to use.

Another problem associated with the prior art backrest latch mechanisms is that even when the backrest is locked in the vertical position, the backrest is often unstable relative to the seat support assembly. In order to permit the physically impaired to withdraw the latch pin from the receiving aperture, the pin must be relatively loose and freely releasable when engaged with the aperture. Unfortunately, radial instability of the pin relative the receiving aperture causes the backrest to experience considerable angular movement relative to the seat support assembly. Such motion may be critical to those requiring upper torso stability while seated in the wheelchair.

DISCLOSURE OF INVENTION

Accordingly, it is an object of the present invention to provide a latch assembly for a wheelchair which releasably locks a movable frame member to a stationary frame member.

Another object of the present invention is to provide a foldable backrest latch assembly which increases stability and reduces angular movement of the backrest assembly when latched.

It is another object of the present invention to provide a latch assembly for a wheelchair which can be disengaged by one hand to facilitate operation by those physically impaired.

Still another object of the present invention is to provide a foldable backrest latch assembly which can be retrofit to most existing wheelchairs with foldable backrests.

Yet another object of the present invention is to provide a latch assembly for a wheelchair which is operable without continuous manual engagement.

It is a further object of the present invention to provide a foldable backrest latch assembly for a wheelchair which is durable, compact, easy to maintain, has a minimum number of components, is easy to use by unskilled personnel, and is economical to manufacture.

The present invention includes a latch assembly for a wheelchair including a movable frame member mounted to a stationary frame member for articulation between a deployed position and a moved position. The latch assembly includes a latch bolt having a first surface and a base member having a second surface. One of the bolt and the base are manually movable between a latched position and the released or unlatched position. In the latched position, the first surface is oriented in an angularly aligned orientation and cooperates with the second surface to releasably latch the movable frame member to the stationary frame member in the deployed position. In the released position, the first surface is disengaged from the second surface such that the movable frame member is free to articulate from the deployed position to the moved position. The latch assembly includes a biasing mechanism biasing one of the bolt and base toward the latched position. The movable one of the bolt and base is retained in the released position in a stable condition with the first surface out of engagement with and skewed relative to the second surface when no longer gripped. Preferably, the latch bolt is mounted for sliding movement and the biasing mechanism further biasing the bolt for automatic movement of the bolt back to an angularly aligned orientation for latching upon articulation of the movable frame member from the deployed position to the moved position.

The latch assembly is particularly suitable for use in latching a backrest of the wheelchair to the wheelchair frame. Accordingly, the present invention provides a foldable backrest latch assembly which releasably latches the backrest in a generally vertical position relative to the seat support while providing substantial backrest stability. Further, the foldable backrest latch assembly provides one-handed operation to manually release the backrest from the latched vertical position by continuously retaining the latch assembly in the released position with the first mating surface out of engagement with the second mating surface.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

BEST MODE OF CARRYING OUT THE INVENTION

Figure 1:
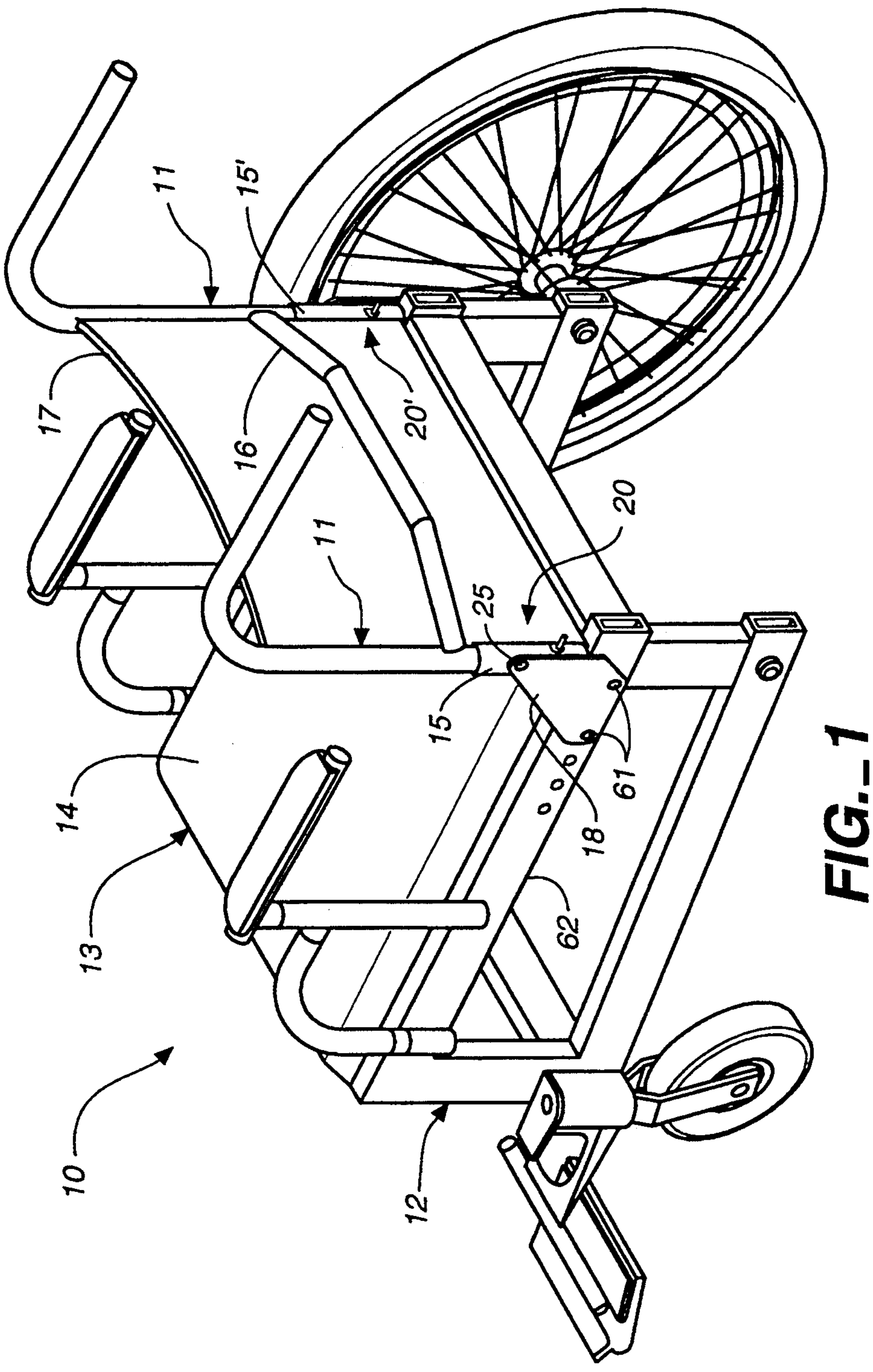
FIG. 1 is a rear perspective view of the left side of a wheelchair with the left drive wheel removed and illustrating a foldable backrest latch assembly constructed in accordance with the present invention.

The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein. It will be noted here that for a better understanding, like components are designated by like reference numerals throughout the various figures.

Attention is now directed to FIG. 1, where the subject latch assembly, generally designated 20, for a wheelchair 10 is illustrated and is most preferably employed for use with a foldable backrest 11 of the type frequently incorporated into manual and powered wheelchairs. The present latching assembly, however, may be employed between many joint assemblies of a wheelchair without departing from the true spirit and nature of the present invention.

FIG. 1 illustrates a wheelchair apparatus 10 which includes a wheelchair frame 12 supporting a seat assembly 13. Seat assembly 13, in turn, includes a seat 14 and backrest 11 movably mounted to wheelchair frame 12 for articulation between a generally vertical, deployed position (solid lines in FIG. 2) and a generally horizontal moved or folded position (phantom lines in FIG. 2). Backrest latch assembly 20 is operably coupled between wheelchair frame 12 and backrest 11 to releasably latch backrest 11 in the vertical deployed position relative to seat 14 so that backrest 11 will not inadvertently fold down during normal operation.

Figure 2:
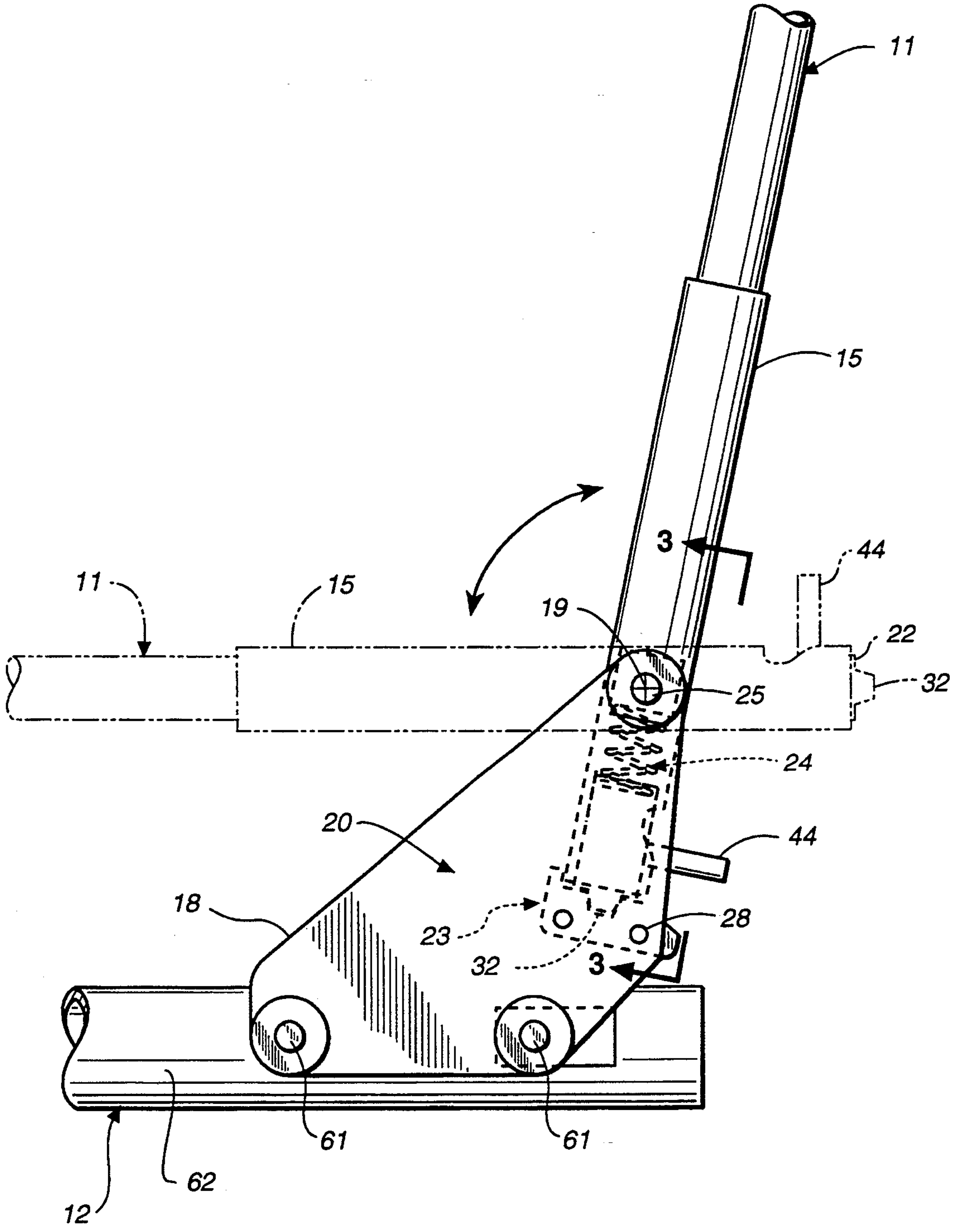
FIG. 2 is an enlarged, fragmentary, side elevation view of the foldable backrest latch assembly of FIG. 1 mounted to a seat support assembly.

Briefly, in accordance with the present invention and as shown in FIG. 2, backrest latch assembly 20 includes a bolt 22 and a base member 23 each of which cooperate when bolt 22 is in an aligned orientation to releasably latch backrest 11 in the generally vertical deployed position. One of bolt 22 and base 23 is manually moveable between a latched position (solid lines in FIG. 4), releasably coupling bolt 22 and base member 23 together, and a released position (broken lines in FIG. 4) which disengages sliding bolt 22 from latching surfaces in base member 23 such that backrest 11 is free to articulate from the vertical deployed position to a horizontal moved position (phantom lines in FIG. 2). In the preferred form, bolt 22 is mounted for sliding movement and base 23 is fixedly mounted to wheelchair frame 12. Biasing means, generally designated 24, biases movable bolt 22 toward the latched position, and the latch bolt 22 is further mounted for movement to a released position in which the bolt is turned or skewed about its longitudinal axis. In the turned or skewed orientation, bolt 22 is retained in a stable condition and out of engagement with latching surfaces of base member 23 upon manual disengagement or release of the bolt. Bolt 22 is further mounted for guided movement, and biasing means 24 further biases bolt 22, for movement back toward the aligned or unskewed orientation upon articulation of backrest 11 from the deployed position to the folded or moved position so that the bolt will thereafter automatically latch with the base when the backrest is returned to vertical.

Therefore, unlike the prior art latch assemblies, backrest latch assembly 20 of the present invention simplifies operation thereof, and particularly release from the deployed position, by eliminating the need to continuously manually engage the backrest latch assembly and simultaneously articulate the backrest from the vertical deployed position toward the folded or moved position. Once sliding bolt 22 of the present invention is manually withdrawn out of engagement with latching surfaces on base member 23, the bolt can be maintained in a stable unlatched condition despite the lack of continuous manual contact by the latch operator. Since latch means 20 is continually retained in an unlatched condition, the operator may articulate backrest 11 at his or her convenience and may, further, grasp an entirely different and physically more appropriate region of backrest 11. Accordingly, the backrest latch assembly of present invention is particularly advantageous for use by the physically impaired who have limited manual dexterity.

This stable unlatched or released feature is particularly desirable since most wheelchairs employ two backrest latch assemblies 20 and 20' (i.e., one on each side of the backrest, as shown in FIG. 1). In the prior art backrest latch mechanisms, two-handed simultaneous and continuous disengagement of the latch mechanisms is required, together with simultaneous commencement of articulation of backrest 11 from the vertical deployed position toward the horizontal moved position.

Typically, backrest 11 is pivotally mounted to wheelchair frame 12 about a substantially horizontal backrest axis 19. In the horizontal or moved position, the overall height dimension of wheelchair apparatus 10 is reduced to facilitate storage or transportation of wheelchair apparatus 10. Backrest 11 generally includes a pair of spaced-apart substantially parallel backrest tubular frame members 15 and 15' rigidly coupled together by a crossbar 16, as best viewed in FIG. 1. A fabric material 17 or the like is mounted to and extends between tubes 15 and 15' to provide the support necessary for the wheelchair occupant's back.

Pivotal mounting of wheelchair back 11 to wheelchair frame 12 may be accomplished by a pivotal mounting plate member 18, which is fixed by a pair of fasteners 61 on the outside of horizontal frame member 62 and which is positioned adjacent to and on the outside of each of backrest tube frame members 15 and 15'. As used herein, therefore, "frame means" shall be deemed to include mounting plate 18 which is rigidly secured to frame member 62. Each backrest tube frame member 15, 15' is mounted, via pivot pin or bolt 25, to each respective plate member 18 for pivotal movement about a substantially horizontal backrest axis 19.

Accordingly, in the preferred embodiment, a pair of foldable backrest latch assemblies 20 and 20', as shown in FIG. 1, are employed with each latch assembly being operably coupled between backrest tube frames 15 and 15', and latch base member 23 carried by plate member 18. These two latch assembles 20 and 20' are substantially identical and together provide greater balance and overall stability for backrest 11 relative seat assembly 13 when latched in the vertical or deployed position.

Figure 4:
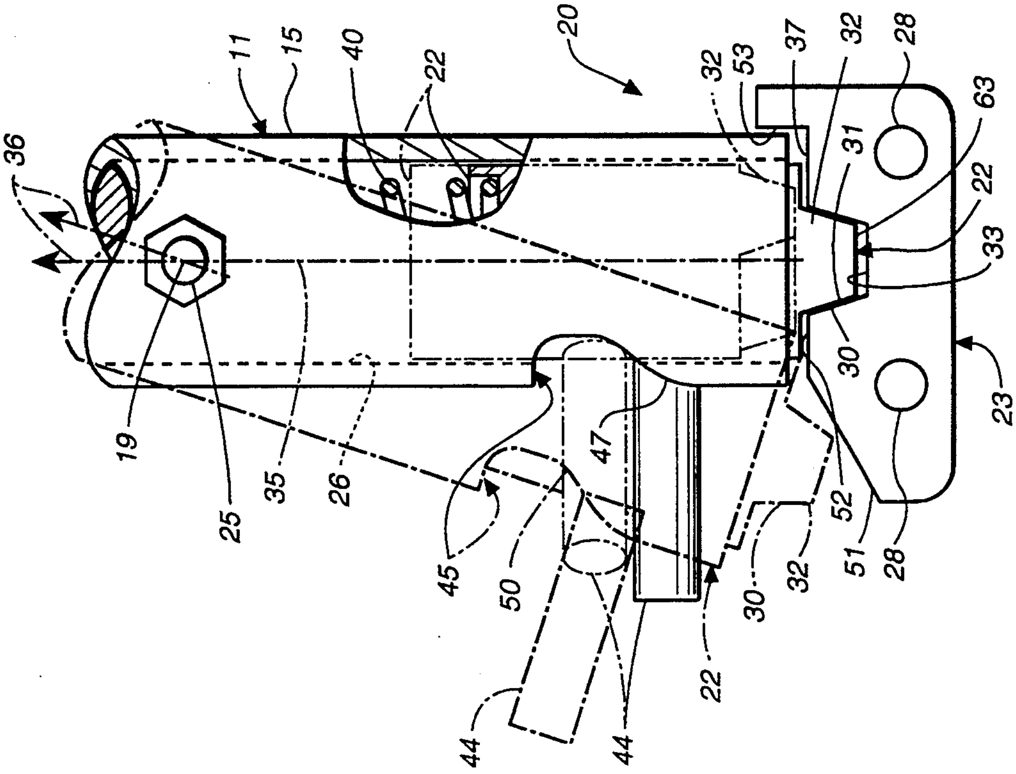
FIG. 4 is a fragmentary side elevation view of the foldable backrest latch assembly taken substantially along the plane of line 4—4 in FIG. 3 illustrating the pivotal movement of the tongue portion of the sliding bolt in broken lines.
Figure 3:
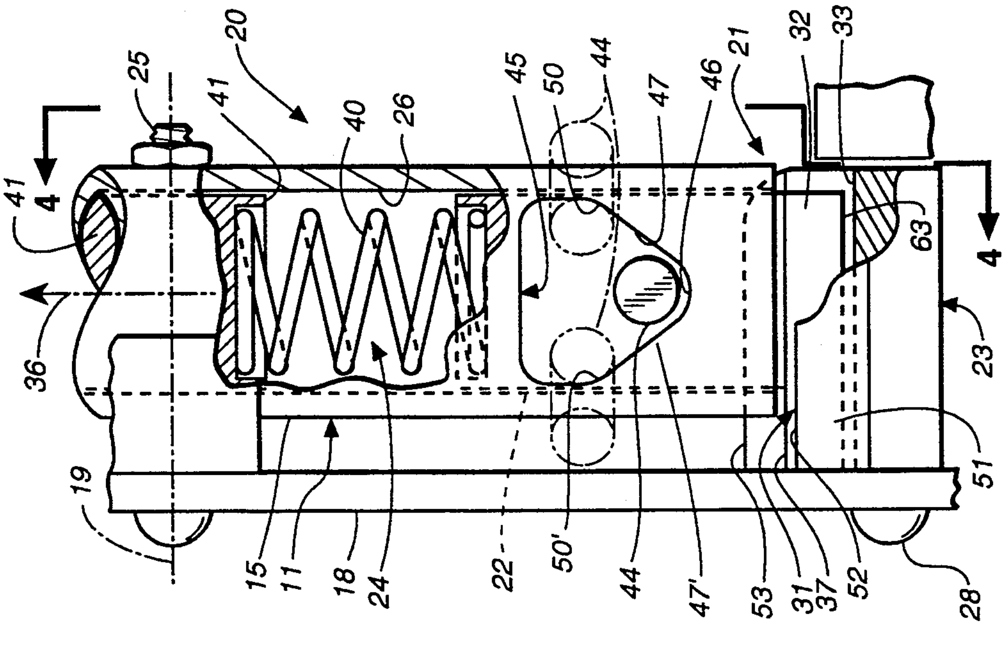
FIG. 3 is an enlarged, fragmentary, rear elevation view, partially broken away, of the foldable backrest latch assembly taken substantially along the plane of line 3—3 in FIG. 2.

Referring now to FIGS. 3 and 4, only one backrest latch assembly 20 will be described in detail for the ease of description. As above-indicated, backrest latch assembly 20 includes base member 23 mounted to pivotal mounting plate 18 and sliding bolt 22 carried by backrest tube frame member 15, which bolt and base interengage to provide a stable, but releasable, latch assembly.

While it is conceivable that sliding bolt 22 could be mounted to wheelchair frame 12 and base 23 could be mounted to backrest 11, in the preferred form, base member 23 is rigidly mounted to plate member 18 of wheelchair frame 12 by fasteners 28 and sliding bolt 22 is a slidably received in a bore or cavity 26 formed in the lower end of backrest tube frame member 15. Hence, when backrest 11 pivots about backrest pivot pin 25 and pivotal axis 19, sliding bolt 22 also swings about axis 19 relative to stationary base member 23.

Preferably, sliding bolt 22 is substantially cylindrical shaped and is dimensioned to smoothly reciprocate in and out of the mating bore or cavity 26 of tubular frame member 15. Extending from one end of sliding bolt and outwardly from tube 15 is a first latch shoulder or surface 30 (FIG. 4) formed and dimensioned to cooperate with an opposing second latch shoulder or surface 31 on base member 23 to releasably latch backrest 11 to plate 18 of wheelchair frame 12. Base member 23 and sliding bolt 22 therefore must be positioned relative one another to allow first surface 30 and second surface 31 to cooperatively engage each other.

In the preferred form, first shoulder or surface 30 of sliding bolt 22 is provided on an inwardly tapered tongue portion 32 projecting outwardly from an end of bolt 22. Second latch shoulder or surface 31 is provided as a surface in a slot 33, which preferably is formed and dimensioned to substantially mate with and releasably receive tongue portion 32, when the tongue is oriented in an angularly and pivotally aligned orientation relative slot 33. Once tongue portion 32 is angularly aligned with slot 33, as will be described in greater detail below, bolt 22 can be moved to the latched position with base member 23 to latch the components together. In this position, backrest 11 is situated in the generally vertical deployed position, as shown in the solid lines of FIGS. 3 and 4.

Biasing means 24 biases sliding bolt 22 outwardly of cavity 26 so that tongue portion 32 is snugly urged into wedge-shaped slot 33. This mating configuration (i.e., tapered tongue portion 32 and wedge-shaped slot 33), when interengaged, provides considerable stability between sliding bolt 22 and base member 23 by reason of the interengaged tapering surfaces 30 and 31 and the similarly formed surfaces on the opposite side of the tongue and slot. Such interengagement greatly reduces any slack or looseness in the latched position so that backrest 11 will not tilt or oscillate about backrest pivotal axis 19. Accordingly, a wheelchair occupant requiring substantial torso stability relative seat 14 may be accommodated, unlike the prior art backrest latch mechanisms.

In order to enable latch bolt 22 to be moved to a stable, yet unlatched position, bolt 22 preferably is mounted for both reciprocation in cavity 26 and for rotation about its longitudinal axis 35. Bolt 22 is released from the latched position and moved to a stable unlatched condition by withdrawing tongue portion 32 axially in the direction of arrow 36 until tongue portion 32 is out engagement with slot 33 of base member 23, although still substantially oriented in an angularly aligned orientation with the slot. As tongue 32 is being withdrawn, however, it also may be rotated about the bolt longitudinal axis 35, in either direction, to a skewed position (broken lines in FIG. 4) so that tongue portion 32 extends transversely or at an angle to slot 33. FIG. 4 illustrates that end surface 63 of tongue 32 spans across slot 33 and is supported in a stable condition or upwardly facing surface 37 of base 23. In this skewed orientation, tongue portion 32 is prevented from being urged down into and cooperating with slot 33. Once the tongue is lifted and rotated to the skewed orientation, compression spring 40 urges tongue portion 32 against upper planar surface 37 to frictionally retain tongue portion 32 angularly misaligned relative to slot 33 so that bolt 22 is retained in a stable unlatched or released position. It will be appreciated, however, that biasing means 24 could include any means for biasing, such as gravity.

A manually engageable latch lever 44 extends from bolt 22 and facilitates manual displacement of bolt 22 to move tongue portion 32 axially against the spring biasing force and rotate the bolt about longitudinal axis 35. Preferably, latch lever projects outwardly through a guide opening 45 (FIG. 3) provided in tubular frame 15. Guide opening 45 is formed and dimensioned to permit sufficient axial and angular movement of latch lever therein so that the operator can manually move tongue portion 32 to the stable unlatched or released position.

In addition to providing one-handed, releasable unlatching, it is a further important feature of the latch assembly of the present invention that the latch will return automatically to the position for latching when the latch is pivoted out of engagement with base 23. Thus, when backrest 11 is unlatched, each of latches 20 and 20' can be moved to a stable released position for pivoting of the backrest. Once the backrest is pivoted, however, bolt 22 in each latch assembly 20, 20' automatically moves to an angularly aligned and outwardly displaced position to ensure automatic re-latching of the backrest when it is swung back to the vertical position. The wheelchair user, therefore, does not have to remember to release or move the latch assembly from its unlatched or released position in order to re-latch the backrest to the frame. This occurs automatically and helps to ensure that the wheelchair user will not sit in the wheelchair with the backrest unlatched.

Automatic repositioning of bolt 22 is accomplished in the present latch assembly by providing guide surfaces which combine with biasing spring 40 to move bolt 22 back to an angularly aligned and extended position. As best viewed in FIG. 3, therefore, guide opening 45 is formed in backrest tube members 15 and 15' and includes opposing guide side surfaces 47 and 47' converging from corner portions 50 and 50' to a central guide trough 46 at a lower end of the opening.

In order to unlatch bolt 22, lever 44, which is positioned at trough 46, is gripped and lifted along either surface 47, 47', or lifted straight up and then rotated to one of corners 50, 50', to position tongue portion 32 in a skewed orientation transverse to slot 33. Articulation of the unlatched backrest 11 about backrest pivotal axis 19 may then take place. As first shoulder or surface 30 of bolt 22 is pivoted clear of base member 23, biasing means 24 urges bolt 22 out of tube bore or cavity 26 along bolt longitudinal axis 35. During movement of bolt 22 along bolt longitudinal axis 35, a side of latch lever 44 engages one of guide surfaces 47 or 47' of guide opening 45, which directs latch lever 44 from the skewed orientation toward the aligned orientation. The latch assembly of the present invention, therefore, automatically moves bolt 22 back to the angularly aligned and extended orientation upon articulation of backrest 11 from the vertical deployed position to the horizontal moved position. Accordingly, when backrest 11 is returned from the horizontal position to the vertical position, tongue portion 32 is oriented in an aligned orientation relative slot 33 and bolt 22 can automatically move to the latched position with wedge-shaped tongue portion 32 engaging wedge-shaped slot 33.

Base member 23 preferably includes a cam surface 51 inclined upwardly and formed to provide a means for retracting bolt 22 against spring 40. Upon pivotal return of backrest 11 tongue portion 32 engages cam surface 51 which urges bolt 22 into cavity 26 overcoming the resistance force caused by spring 40. As shown in phantom lines in FIG. 4, retraction of bolt 22 into cavity 26 in the direction of arrow 36 continues until the distal end of tongue portion clears cam surface 51 and engages a lower planar surface 52 of base 23. Lower planar surface 52 maintains bolt 22 in this retracted condition until backrest 11 is fully pivotally returned to the deployed vertical position. Subsequently, as tongue 32, being in the aligned orientation, moves past lower planar surface 52, spring 40 urges bolt 22 outwardly along longitudinal axis 35 and bolt 22 to the latched position.

When backrest 11 is returned from the moved position to the deployed position, a backstop member 53 prevents pivotal motion of tube frame 15 about pivotal axis 19 past the deployed position. Backstop 53 is provided at the rear of base member 23 and extends transverse to second mating surface 31, as shown in FIG. 3.

One important feature of the present invention is that upper planar surface 37 of base 23 is at a vertical height greater than lower planar surface 52. This vertical difference, as shown in FIGS. 3 and prevents inadvertent return of backrest 11 to the deployed position once initially released to the moved position. When tongue portion 32 is in the skewed orientation and engages upper planar surface 37 so that bolt 22 is retained in the released position, backrest can be pivoted toward the moved position. Once tongue portion 32 is pivotally moved past upper planar surface 37, biasing means 24 urges tongue portion 32 outward against lower planar surface 52. Should tube frame 15 inadvertently be pivoted back toward the deployed position while tongue portion 32 is in the skewed position orientation, tongue portion 32 will abut the back side wall of wedge-shaped slot 33. Hence, the vertical elevation difference between lower planar surface 52 and upper planar surface 37 reduces inadvertent movement of tongue portion 32 back over upper planar surface 37.

What is claimed is:

1. A latch assembly for a wheelchair apparatus including a movable frame member mounted to a stationary frame member for movement between a deployed position and a moved position, said latch assembly comprising:
   - a bolt mounted for sliding movement to one of said movable frame member and said stationary frame member and having a first surface;
   - a base member mounted to the other of said movable frame member and said stationary frame member and having a second surface, one of said bolt and said base member being manually movable between a latched position with said first surface oriented in an aligned orientation and in cooperative engagement with said second surface to releasably latch said movable frame member to said stationary frame member in said deployed position, and a released position with said first surface disengaged from said second surface such that said movable frame member is free to move from said deployed position to said moved position;
   - a biasing device biasing one of said bolt and said base toward said latched position;
   - a retaining mechanism stably retaining one of said bolt and said base in said released position, while said movable frame member is maintained in said deployed position, with said first surface out of engagement with said second surface upon manual release of said bolt; and
   - said one of said bolt and said base being further mounted and biased by said biasing device for automatic movement back to said aligned orientation upon movement of said movable frame member from said deployed position to said moved position.

2. The latch assembly as defined in claim 1 wherein, said bolt is mounted for movement relative to said base, and said biasing device biases said bolt toward said latched position.

3. The latch assembly as defined in claim 2 wherein, said bolt is mounted for axial displacement longitudinally along a longitudinal axis thereof to a position preventing engagement of said first surface with said second surface and is further mounted for rotation about said axis to produce an angularly skewed orientation, relative said longitudinal axis and while said movable frame member is maintained in said deployed position, of said first surface relative to said second surface in said released position, and said retaining mechanism is provided by a support surface on said base for stable support of said bolt in an axially displaced and angularly skewed orientation, relative said longitudinal axis.

4. The latch assembly as defined in claim 2 wherein, said first surface includes a tongue portion projecting outwardly from one end of said bolt, and said second surface is formed with a slot portion dimensioned for receipt of said tongue portion when said first surface and said second surface cooperatively engage to releasably latch said movable frame member to said stationary frame member.

5. The latch assembly as defined in claim 4 wherein, said tongue portion tapers inwardly.

6. The latch assembly as defined in claim 4 wherein, said base member is rigidly mounted to said stationary frame member, and said bolt is slidably mounted to said movable frame member.

7. The latch assembly as defined in claim 6 wherein, said movable frame member includes a cavity formed and dimensioned to slidably receive said bolt such that said tongue portion projects outward from said cavity.

8. The latch assembly as defined in claim 7 wherein, said bolt is elongated and said tongue portion is mounted for rotation about a longitudinal axis of said bolt and rotates between said latched position, with said tongue portion being in an angularly aligned orientation with said slot when said movable frame member is in said deployed position, and said released position, with said tongue portion being in a sufficiently rotated orientation about said longitudinal axis and relative said slot to prevent entry of said tongue portion into said slot, while said movable frame member is maintained in said deployed position, 9. The latch assembly as defined in claim 8 wherein, said retaining mechanism is provided by forming said base member with a lower surface positioned on one side of said slot and an upper surface positioned on the other side of said slot, and said tongue portion engages at least one of said upper surface and said lower surface to retain said bolt in said released position.

10. The latch assembly as defined in claim 8 wherein, said biasing device is provided by a compression spring mounted between said bolt and said movable frame member, said compression spring biasing said tongue portion outward from said cavity.

11. The latch assembly as defined in claim 10 further including:

a latch lever mounted to said bolt and manually movable to move said bolt between said angularly aligned orientation and said rotated orientation.

12. The latch assembly as defined in claim 11 further including:

guide means mounted to said movable frame member for guiding said tongue portion from said rotated orientation to said angularly aligned orientation upon articulation of said movable frame member from said deployed position to said moved position.

13. The latch assembly as defined in claim 12 wherein, said guide means includes a guide surface formed to engage said latch lever to direct said bolt to said angularly aligned orientation when said compression spring urges said bolt outward from said cavity.

14. The latch assembly as defined in claim 9 wherein, said base member includes a stop portion limiting movement of said movable frame member from said moved position to said deployed position.

15. The latch assembly as defined in claim 1 wherein, said movable frame member is a backrest pivotally mounted to said stationary frame member.

16. The latch assembly as defined in claim 4 wherein, said base member includes a cam surface formed to cooperate with said bolt to direct said tongue portion into said slot of said base member upon movement of said movable frame member from said moved position to said deployed position.

17. In a movable backrest latch assembly for a wheelchair apparatus including a wheelchair frame supporting a seat assembly and a backrest mounted for articulation between a deployed position and a collapsed position, said latch assembly including a latch mechanism operably coupled between said wheelchair frame and said backrest for releasably latching said backrest in said deployed position, the improvement in said backrest latch assembly comprising:

said latch mechanism includes a slidable bolt having a first surface, and a base member having a second surface, said bolt being manually movable between a latched condition with said first surface oriented in an angularly aligned orientation and cooperating with said second surface to releasably latch said backrest to said wheelchair frame in said deployed position, and an unlatched condition with said first surface disengaged from said second surface and angularly misaligned with respect to said second surface such that said backrest is free to articulate from said deployed position to said collapsed position;

a biasing device biasing said bolt toward said latched condition, and a retaining mechanism retaining said bolt in said unlatched condition while said backrest is maintained in said deployed position; and said bolt being further mounted and said biasing device further biasing in said bolt for automatic movement of said bolt back to said latched condition upon articulation of said backrest from said deployed position to said collapsed position.

18. The backrest latch assembly as defined in claim 17 wherein, said first surface is provided by a tongue portion projecting outwardly from one end of said bolt, and said second surface is provided by a slot portion formed in said base member and dimensioned for receipt of said tongue portion.

19. The backrest latch assembly as defined in claim 18 wherein, said tongue portion tapers inwardly.

20. The backrest latch assembly as defined in claim 19 wherein, said base member is rigidly mounted to said wheelchair frame, and said bolt is slidably mounted to said backrest.

* * * * *

UNITED STATES PATENT AND TRADEMARK OFFICE
CERTIFICATE OF CORRECTION

PATENT NO. : 5,364,165

DATED : November 15, 1994

INVENTOR(S) : James Okamoto

It is certified that error appears in the above-identified patent and that said Letters Patent is hereby corrected as shown below:

Column 8, line 17, after "FIGS. 3" insert ---and 4--.

Column 10, claim 17, line 59, after "biasing" delete "in".

Signed and Sealed this

Seventh Day of March, 1995

Attest:

BRUCE LEHMAN

*Attesting Officer*

*Commissioner of Patents and Trademarks*